W. F. DOLL.
RESILIENT WHEEL.
APPLICATION FILED JAN. 24, 1914.
1,136,868.
Patented Apr. 20, 1915.
2 SHEETS—SHEET 1.
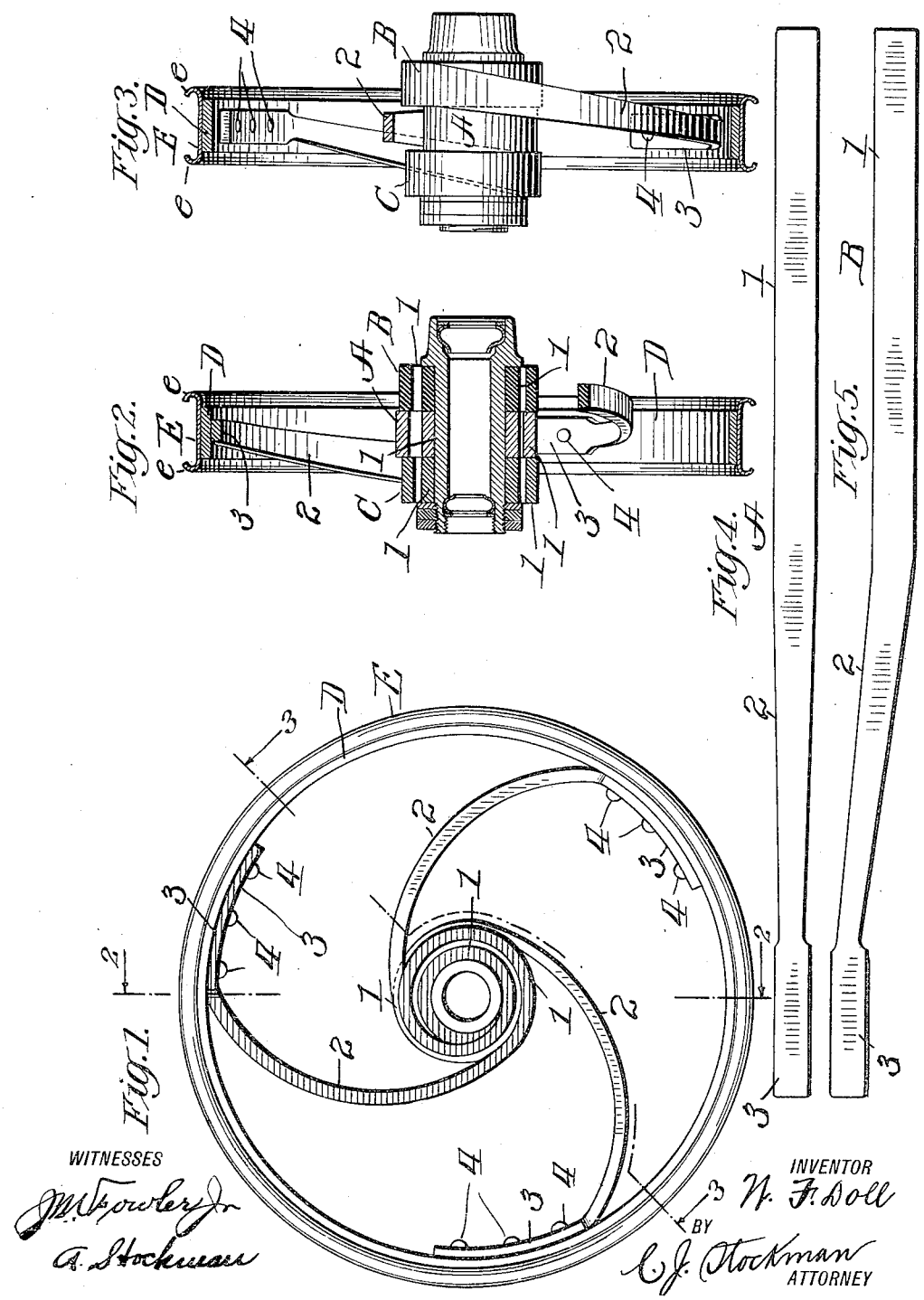
WITNESSES
INVENTOR
W. F. Doll
BY
C. J. Stockman
ATTORNEY

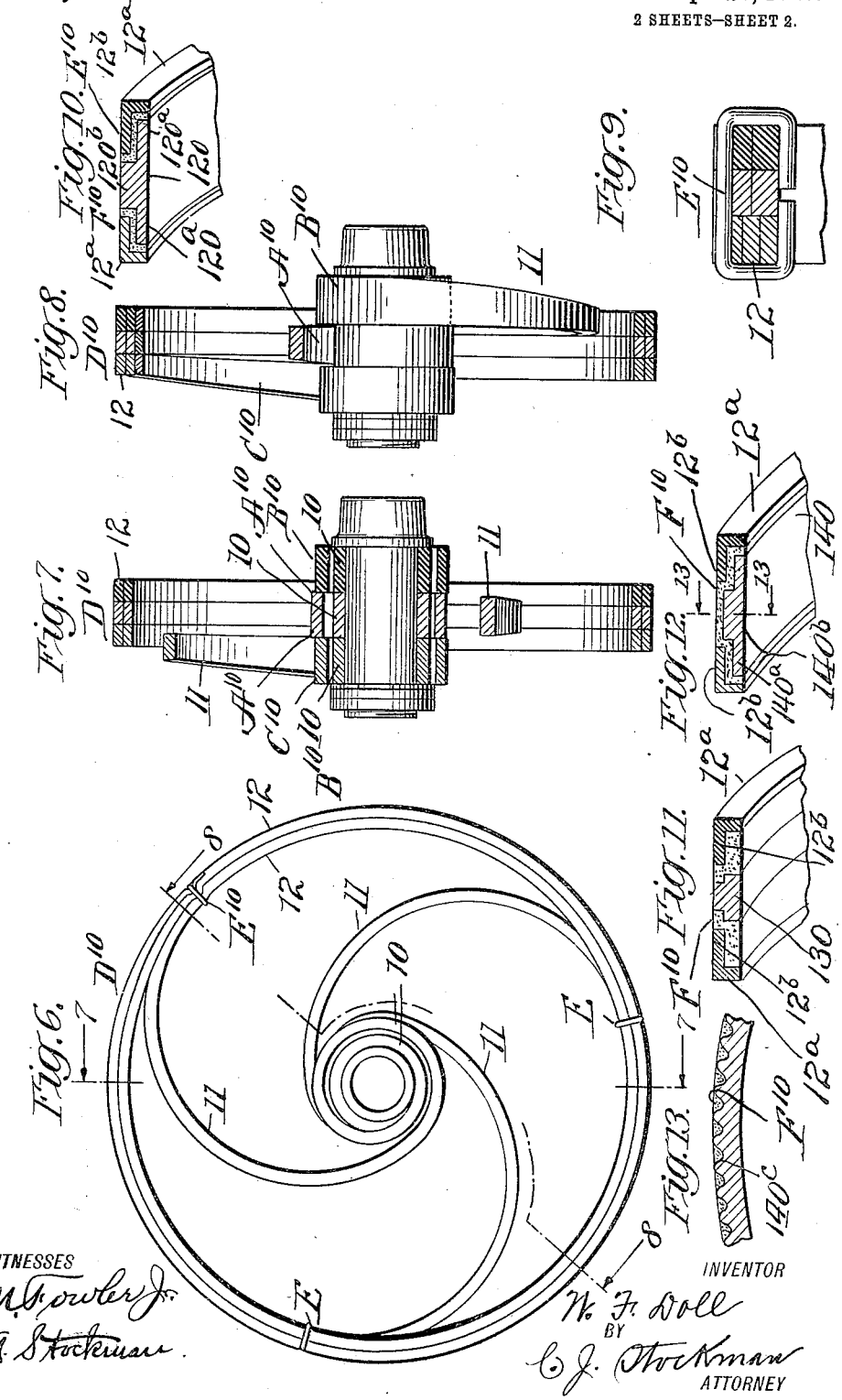

UNITED STATES PATENT OFFICE.

WILLIAM F. DOLL, OF NEW YORK, N. Y., ASSIGNOR OF ONE-HALF TO LEE McCLUNG, OF WASHINGTON, DISTRICT OF COLUMBIA; ROBERT G. McCLUNG ADMINISTRATOR OF SAID LEE McCLUNG, DECEASED.

RESILIENT WHEEL.

1,136,868.  Specification of Letters Patent.  Patented Apr. 20, 1915.

Application filed January 24, 1914. Serial No. 814,165.

*To all whom it may concern:*

Be it known that I, WILLIAM F. DOLL, a citizen of the United States, residing in the borough of Manhattan, in the city, county, and State of New York, have invented new and useful Improvements in Resilient Wheels, of which the following is a specification.

This invention relates to a spring wheel of a type generically similar to that embraced in my Patent No. 1,053,976, dated February 25, 1913 and in my co-pending application (marked "A") executed of even date herewith and bearing the Serial #814,164, that is to say, the present invention relates to a spring wheel which essentially includes a strip or bar of spring metal one of whose ends is coiled spirally to form a resilient axial portion, another part of the length of said bar or strip being bent to extend at a tangent, or approximately at a tangent, to the spirally coiled portion to form a spoke.

The subject of the present application embraces certain particular novel forms and correlations of parts as will be understood from the hereinafter description.

Referring to the drawings, wherein like characters of reference denote like parts in the several views: Figure 1 is a view partly in side elevation and partly in section showing one form of spring wheel within the present invention; Fig. 2 is a vertical section on the line 2—2 of Fig. 1; Fig. 3 is a section on the line 3—3 of Fig. 1; Fig. 4 is a detail view of one of the spring elements before it has been coiled; Fig. 5 is a like view of another of said spring elements; Fig. 6 is a side elevation showing a different form of wheel within the present invention; Fig. 7 is a section on the line 7—7 of Fig. 6; Fig. 8 is a section on the line 8—8 of Fig. 6; Fig. 9 is a detail view showing one way of connecting the spring elements together at the rim of the wheels; Figs. 10, 11 and 12 are views showing modifications; Fig. 13 is a section on the line 13—13 of Fig. 12.

Referring to the construction shown in Figs. 1 to 5 inclusive: The wheel comprises three spring elements marked A, B and C, respectively, and a separate rim, marked D. The number of spring elements employed however may be varied, and I do not limit myself to the use of three, although such number is preferred. In this particular exemplification of the invention the wheel is intended to be used as a vehicle wheel having a rubber or other suitable tread or tire (not shown), and consequently the rim D is provided with a separate section, marked E, having flanges *e* to receive such tread or tire, but it will be understood that this is not essential and it will also be understood that even where such a tire is to be used the part D of the rim may be formed to receive and hold the same, without departing from the spirit of the invention. Each spring element comprises a part marked 1 which is coiled in one or more convolutions at the axis of the wheel, a part marked 2 which preferably extends off approximately at a tangent from the coiled part 1, and a part marked 3 which lies along the inner surface of the rim D and is riveted or otherwise suitably secured to the latter, as shown at 4 in Figs. 1 and 3. In practice it is preferred to use three such elements A, B and C, arranged side by side at the axis of the wheel but the use of two or more of such elements will be within the spirit of the invention. The spoke portions 2 of the outer elements B and C are inclined from the coiled portion 1 of said elements toward a plane which intersects the rim and the central element A, at the transverse centers of the latter, the portions 3 of all of said elements being thus arranged in a plane which intersects the central element A.

In this particular exemplification of the invention shown in these figures, each spring element A, B and C is made from a flat strip of equal thickness throughout but varying in its transverse dimensions, the part 1 being wider than either of the other parts, the part 2 being tapered outward from the part 1 to the part 3 and the part 3 being somewhat wider than the outer end of the part 2, the widening of the part 3 as compared with the adjacent end of the part 1 being not essential but preferred in some cases in order to get a sufficient transverse bearing for the outer end of the element against the inner surface of the rim.

Referring now to the construction shown in Figs. 6, 7, 8 and 9, it will be noted that this particular exemplification of the invention is in one respect distinguished from that shown on the first sheet of the drawing by having its rim or felly integral with the spoke and axial portions. As herein exemplified, there are three spring elements, marked $A^{10}$, $B^{10}$ and $C^{10}$, respectively, but this number may be varied without departing from the spirit of the invention. Each of these spring elements has one of its ends coiled to form a plurality of convolutions 10, 10 at the axis of the wheel, a spoke portion 11 which is arranged approximately tangentially to the axial portion and is thence coiled in one or more convolutions 12, 12 which lie closely one upon the other and form the rim $D^{10}$. The portions which form the coils 10 of the several spring elements lie side by side, as shown and are wider than the remaining portions of said elements. The portions which form the spokes 11 are tapered as in the first construction and these parts of the two outer elements $B^{10}$ and $C^{10}$ are inclined toward the intermediate element $A^{10}$ and the portions 11 which form the rim $D^{10}$ will lie closely side by side and are narrower than the parts 10 and are arranged over the center of the hub. The outer members 12 may be held together against lateral displacement in any suitable way, as for example by the clips $E^{10}$ shown in Figs. 6 and 9. These clips are seated in grooves $e^{10}$, formed by depressions in the rim portions of the wheels, whereby their outer surfaces are flush with the adjacent portions of the rim.

In Figs. 10, 11, 12 and 13 I have shown certain constructions of rim-forming parts such as afford provision for the use of sound-deadening material, such as paper, fiber or rubber, for example. In all of the last named figures the parts which correspond to the rim-forming parts 12 of the outer elements $B^{10}$ and $C^{10}$ are of angle iron, and, being of like construction, they are similarly designated in all the figures, their side flanges being marked $12^a$ and their other portions $12^b$. The corresponding parts of the intermediate element while all are approximately of inverted T-shape yet vary somewhat from each other and in Fig. 10 this part is marked 120, in Fig. 11 it is marked 130, and in Figs. 12 and 13 it is marked 140. In the form shown in Fig. 10, the laterally-extending flanges marked $120^a$ of the part 120 and the wings $12^b$ are arranged in overlapping planes and the intermediate web marked $120^b$ extends to the plane of the outer surface of the rim or felly. In the form shown in Fig. 11, the lateral flanges of the part 130 terminate before they reach the inner edges of the wings $12^b$. In the form shown in Figs. 12 and 13 the lateral flanges $140^a$ of the part 140 and the wings $12^b$ are arranged in overlapping planes, as in Fig. 10, but the vertical web $140^b$ is formed at intervals with pockets $140^c$ which extend transversely thereof and are spaced from each other. In all of these exemplified forms the portions referred to are spaced from each other and the shock-receiving or sound-deadening filling $F^{10}$ is arranged in said spaces and interposed between the member 120, 130 or 140 and the member $12^a$. While the clips $E^{10}$ are shown only in Figs. 6 and 9, it will be understood that they may be used on any of the wheels having a plurality of rim-forming members arranged side by side.

It will be noted that I have particularly exemplified different forms of wheels made of a plurality of spring elements each of which has an outwardly tapered spoke integral with an axial portion formed of one or more convolutions and extending in a direction which is somewhat tangential to the said axial portion, but is sufficiently curved to give it some degree of resilience.

The different forms of wheels herein exemplified are so constructed as to be resilient both radially and laterally and it is possible so to make them that they will be equally resilient in both directions. Moreover, they are strong and durable, are well balanced, and have their center of mass and greatest strength at the axial portion. The forms particularly exemplified on the second sheet of the drawings, that is to say, those forms wherein each spring element is such as to include a section for the rim or felly, a section for the spoke and a section for the axial portion, are preferred because a wheel made from such elements may be made entirely by machinery, the need for bolts, nuts, rivets or like fastening elements being eliminated.

While I have described the invention as being particularly for use as a vehicle wheel, it will be apparent that it may be embodied as a gear wheel, pulley or the like and hence I do not wish to be understood as being restricted to the embodiment of the invention in a vehicle wheel.

While I have shown in Figs. 10, 12 and 13 the central member as being wider than the side members of the felly, yet in practice it is preferred to make these three members of width equal to each other.

Having now described the invention what I believe to be new and desire to secure by Letters Patent, is:—

1. A resilient wheel having a plurality of metallic elements widened at one end and tapered outward from said end, the widened ends of each element being coiled to provide one or more convolutions and said ends being arranged in an endwise relation and forming a hub portion or axial portion of the wheel of greater width than the rim portion thereof, the tapered sections of the strip forming the spoke portions of the wheel and the outermost elements being inclined from the extremities of the hub portion toward the central plane of the wheel, and means forming a rim.

2. A resilient wheel having a plurality of metallic elements each bent to provide one or more convolutions to form a resilient hub or axial portion for the wheel of greater width than the rim portion thereof and thence outward on a curve to form a resilient spoke portion and thence around in a plurality of superimposed circular convolutions to form a rim portion, said elements being relatively so arranged that their hub portions will be disposed in an endwise relation to each other and their rim portions similarly disposed in an endwise relation to each other, the outermost of the elements having their spoke portions extending inwardly from the extremities of the hub toward the central plane of the wheel.

3. A resilient wheel having a plurality of metallic elements each bent to provide one or more convolutions to form a resilient hub or axial portion and thence outward to form a spoke portion and thence around in a circular convolution to form a rim or felly portion, said elements being relatively so arranged that their hub portions will be disposed in an endwise relation to each other and their rim or felly portions will be arranged in an endwise relation to each other and centrally disposed over the hub portions, the rim or felly portions of said elements being also formed with flanges which are spaced from each other and filling material in said spaces.

4. A resilient wheel having a plurality of metallic elements each bent to provide one or more convolutions to form a resilient hub or axial portion and thence outward to form a spoke portion and thence around in a circular convolution to form a rim or felly portion, said elements being relatively so arranged that their hub portions will be disposed in an endwise relation to each other and their rim or felly portions will be arranged in an endwise relation to each other and centrally-disposed over the hub portions, the rim or felly portion of the intermediate element being of approximately inverted T-shape in cross section and the corresponding portions of the outer elements being of approximately L-shape in cross section, said portions being relatively arranged to form spaces between them, and a filling material in said spaces.

5. A resilient wheel having a plurality of metallic elements each bent to provide one or more convolutions to form a resilient hub or axial portion and thence outward to form a spoke portion and thence around in a circular convolution to form a rim or felly portion, said elements being relatively so arranged that their hub portions will be disposed in an endwise relation to each other and their rim or felly portions will be arranged in an endwise relation to each other and centrally disposed over the hub portions, the rim or felly portion of the intermediate element being of approximately inverted T-shape in cross section and having its outer surface provided with transverse grooves and the corresponding portions of the outer elements being of approximately L-shape in cross section, said portions being relatively arranged to form spaces between them, and a filling material in said spaces and grooves.

6. A resilient wheel having a plurality of metallic elements each having one end wider than the other end, and each also having a portion which is tapered outward from its said wider end, the wider end of each element being bent to provide one or more convolutions to form a resilient hub or axial portion, the tapered portion of each element forming a spoke portion and the portion of each element outward from said spoke portion extending around in one or more circular convolutions to form a rim or felly portion, said elements being relatively so arranged that their hub portions will be disposed in an endwise relation to each other and their rim or felly portions similarly arranged in an endwise relation to each other and centrally disposed around the hub portions, the rim or felly portions having transversely extending depressions and fastening elements extending around said rim portions and securing the same together, the outer surfaces of said elements being substantially flush with the adjacent surfaces of the rim portions.

In testimony whereof I have hereunto set my hand in presence of two subscribing witnesses.

WILLIAM F. DOLL.

Witnesses:
JAMES L. CRAWFORD,
C. J. STOCKMAN.

Copies of this patent may be obtained for five cents each, by addressing the "Commissioner of Patents, Washington, D. C."